(12) United States Patent
Honda et al.

(10) Patent No.: US 11,525,457 B2
(45) Date of Patent: Dec. 13, 2022

(54) IMPELLER FOR CENTRIFUGAL TURBOMACHINE AND CENTRIFUGAL TURBOMACHINE

(71) Applicant: MITSUBISHI HEAVY INDUSTRIES ENGINE & TURBOCHARGER, LTD., Sagamihara (JP)

(72) Inventors: Hironori Honda, Tokyo (JP); Kenichiro Iwakiri, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 95 days.

(21) Appl. No.: 16/610,148

(22) PCT Filed: Oct. 11, 2017

(86) PCT No.: PCT/JP2017/036807
§ 371 (c)(1),
(2) Date: Nov. 1, 2019

(87) PCT Pub. No.: WO2019/073551
PCT Pub. Date: Apr. 18, 2019

(65) Prior Publication Data
US 2020/0056487 A1    Feb. 20, 2020

(51) Int. Cl.
*F04D 29/38*    (2006.01)
*F04D 29/30*    (2006.01)
(Continued)

(52) U.S. Cl.
CPC ............ *F04D 29/384* (2013.01); *F01D 5/021* (2013.01); *F01D 5/141* (2013.01); *F04D 29/284* (2013.01);
(Continued)

(58) Field of Classification Search
CPC .......... F02C 6/12; F04D 29/284; F04D 29/30; F04D 29/305; F04D 29/384; F04D 29/386; F05D 2220/40
See application file for complete search history.

(56) References Cited

U.S. PATENT DOCUMENTS 8,579,591 B2 * 11/2013 Ho ........................... F04D 29/30
416/203
2008/0229742 A1    9/2008 Renaud et al.
(Continued)

FOREIGN PATENT DOCUMENTS

CN    103256248 A    8/2013
CN    104093988 A    10/2014
(Continued)

OTHER PUBLICATIONS

Machine translation of JP 2014-118833 A (Jun. 30, 2014) (Year: 2014).*
(Continued)

*Primary Examiner* — Christopher R Legendre
(74) *Attorney, Agent, or Firm* — Birch, Stewart, Kolasch & Birch, LLP (57) ABSTRACT

An impeller for a centrifugal turbomachine includes: a hub having a small-diameter portion positioned at a first end portion in an axial direction and a large-diameter portion positioned at a second end portion in the axial direction, the large-diameter portion having a greater diameter than the small-diameter portion; and a blade having a first edge positioned at an axial-directional position of the small-diameter portion and a second edge positioned at an axial-directional position of the large-diameter portion, the blade being disposed on an outer peripheral surface of the hub. The impeller is configured such that, when a first radial-directional cross section is a cross section of the impeller at an axial-directional position passing a tip of the first edge, at
(Continued)

least a part of the first radial-directional cross section in a blade-height range of 50% or more is inclined downstream in a rotational direction of the impeller with respect to a radial direction.

11 Claims, 9 Drawing Sheets

(51) Int. Cl.
    *F04D 29/28*     (2006.01)
    *F01D 5/02*     (2006.01)
    *F01D 5/14*     (2006.01)
    *B33Y 80/00*     (2015.01)

(52) U.S. Cl.
    CPC .............. *F04D 29/30* (2013.01); *B33Y 80/00* (2014.12); *F05D 2220/40* (2013.01)

(56) References Cited

U.S. PATENT DOCUMENTS

| | | | | |
|---|---|---|---|---|
| 2013/0272861 | A1* | 10/2013 | Tomita | F04D 17/10 415/185 |
| 2013/0309082 | A1 | 11/2013 | Sugimura et al. | |
| 2014/0314557 | A1 | 10/2014 | Hiradate et al. | |
| 2015/0159670 | A1 | 6/2015 | Saito | |
| 2016/0076551 | A1* | 3/2016 | Saito | F04D 29/245 415/206 |
| 2017/0198712 | A1 | 7/2017 | Berenyi et al. | |
| 2020/0056487 | A1* | 2/2020 | Honda | F04D 29/30 |
| 2020/0088210 | A1 | 3/2020 | Honda et al. | |

FOREIGN PATENT DOCUMENTS

| | | |
|---|---|---|
| CN | 104854350 A | 8/2015 |
| EP | 2918849 A1 | 9/2015 |
| JP | 2005-23901 A | 1/2005 |
| JP | 4178545 B2 | 11/2008 |
| JP | 2014-92138 A | 5/2014 |
| JP | 2014-118833 A | 6/2014 |
| JP | 5608062 B2 | 10/2014 |
| JP | 2016-61223 A | 4/2016 |
| JP | 2016-169613 A | 9/2016 |
| WO | WO 2017/168766 A1 | 10/2017 |

OTHER PUBLICATIONS

Office Action dated Jun. 3, 2020 issued in counterpart Chinese Application No. 201780089796.4 with machine translation.
International Preliminary Report on Patentability and Written Opinion of the International Searching Authority, dated Apr. 23, 2020, for International Application No. PCT/JP2017/036807, with an English translation.
International Search Report, dated Jan. 9, 2018, for International Application No. PCT/JP2017/036807, with an English translation.
Extended European Search Report dated Apr. 14, 2021 issued to the corresponding European Application No. 17928592.9.

\* cited by examiner

--PRIOR ART--

FIG. 11

--PRIOR ART--

IMPELLER FOR CENTRIFUGAL TURBOMACHINE AND CENTRIFUGAL TURBOMACHINE

TECHNICAL FIELD

The present disclosure relates to an impeller for a centrifugal turbomachine and a centrifugal turbomachine including the impeller.

BACKGROUND ART

An impeller for a centrifugal turbomachine, such as a turbocharger and a turbine, has a tendency that centrifugal stress that occurs at the blade surfaces and the blade tip portions increases with the rotation speed. To address such increase of stress, the strength of the impeller can be increased by adjusting the blade thickness or increasing the fillet diameter, but this method may lead to reduction of the throat area or performance deterioration.

Patent Document 1 discloses a technique to reduce deformation due to centrifugal stress by attaching a ring to the blade end portions of the rotor blades (where great deformation occurs when high centrifugal pressure is applied) to enhance the strength. However, this technique causes the structure to become complex, and thus the cost required for manufacturing and assembling may increase.

CITATION LIST

Patent Literature

Patent Document 1: JP2016-061223A

SUMMARY

Problems to be Solved

A typical impeller has been a linear-blade impeller, whose radial-directional cross section at the axial-directional position passing the tip of the edge at the side of the hub small-diameter portion (leading edge in a case of a compressor and trailing edge in a case of a turbine) extends along the radial direction.

In recent years, as the possibility of 3D blade design increases with development of the machining technologies, the present inventors conducted intensive researches on the suitable shape of 3D blades. Accordingly, the inventors found that, in a case of 3D blades, stress that does not cause problems for typical linear blades occurs at the side of blade tips. That is, at the center part of a rotor blade tip (blade end portion), as a result of deformation of the leading edge and the trailing edge due to centrifugal stress, tension and bending moment are generated.

To address this, the blade thickness or the fillet diameter may be increased. However, the structure of the impeller becomes complex and the cost of manufacturing and assembling increases.

In some embodiments, an object is to reduce tension stress and bending moment generated at the side of blade tips of blades of an impeller.

Solution to the Problems (1) According to an embodiment, an impeller for a centrifugal turbomachine includes: a hub having a small-diameter portion positioned at a first end portion in an axial direction and a large-diameter portion positioned at a second end portion in the axial direction, the large-diameter portion having a greater diameter than the small-diameter portion; and a blade having a first edge positioned at an axial-directional position of the small-diameter portion and a second edge positioned at an axial-directional position of the large-diameter portion, the blade being disposed on an outer peripheral surface of the hub. The impeller is configured such that, when a first radial-directional cross section is a cross section of the impeller at an axial-directional position passing a tip of the first edge, at least a part of the first radial-directional cross section in a blade-height range of 50% or more is inclined downstream in a rotational direction of the impeller with respect to a radial direction.

As a result of intensive researches, the present inventor found that tension stress occurs in the center part region between the first edge at the side of the hub small-diameter portion and the second edge at the side of the hub large-diameter portion, as a result of deformation of the edges in opposite directions from one another due to centrifugal stress that accompanies rotation of the impeller. In particular, when designing a 3D blade based on the proven design for linear blades (technique to decide the inclination angle toward the upstream side in the rotational direction with respect to the radial direction for the maximum outer diameter portion where centrifugal stress is maximum, and decide the shape of the small-diameter portion side edge so as to achieve a smooth blade shape in accordance with the maximum outer diameter portion), the first edge at the side of the hub small-diameter portion is inclined toward to the upstream side in the rotational direction in accordance with the inclination direction of the edge at the side of the hub large-diameter portion, and the above tension stress increases.

With the above configuration (1), at least a part of the first radial-directional cross section is inclined toward the downstream side in the rotational direction with respect to the radial direction in the blade height range of not less than 50%, and thus it is possible to deform the side of the first edge and the side of the second edge at the side of the hub large-diameter portion in a direction that does not increase tension stress relatively. Accordingly, it is possible to reduce the tension stress and the bending moment generated at the tip-side center part region between the first edge and the second edge.

(2) In an embodiment, in the above configuration (1), when, on a first reference line connecting midpoints of the first radial-directional cross section in a blade thickness direction, a first hub-side reference point is defined as a radial-directional position of a hub surface of the hub and a first tip-side reference point is defined as a radial-directional position of the tip, the first-tip side reference point is positioned downstream of the first hub-side reference point in the rotational direction.

With the above configuration (2), the first tip-side reference point is positioned downstream of the first-hub side reference point with respect to the rotational direction, and thus it is possible to deform the side of the first edge and the side of the second edge in a direction that does not increase tension stress relatively. Accordingly, it is possible to reduce the tension stress and the bending moment generated at the tip-side center part region between the first edge and the second edge.

(3) In an embodiment, in the above configuration (2), the first reference line includes a curved portion which has a curvature center at a downstream side in the rotational direction in the first radial-directional cross section.

With the above configuration (3), the curvature center of the curved portion is positioned at the downstream side with respect to the rotational direction, and thus it is possible to deform the side of the first edge and the side of the second edge at the side of the hub large-diameter portion in a direction that does not increase tension stress relatively. Accordingly, it is possible to reduce the tension stress and the bending moment generated at the tip-side center part region between the first edge and the second edge.

(4) In an embodiment, in the above configuration (2) or (3), the first reference line includes a linear portion.

With the above configuration (4), with the first reference line including a linear portion, it is possible to simplify the shape of the blade, and the blade can be produced easily.

(5) In an embodiment, in any one of the above configurations (2) to (4), a phase angular difference $\Delta\theta_1$ between the first tip-side reference point and the first hub-side reference point is not smaller than 20 angular degrees.

A 3D blade becomes less feasible in terms of strength as the curve degree increases with reference to a linear blade.

In this regard, with the above configuration (5), by inclining at least the tip side of the first radial-directional cross section in the direction described in the above configuration (1) and ensuring the above phase angular difference $\Delta\theta_1$, it is possible to deform the side of the first edge and the side of the second edge at the side of the hub large-diameter portion in a direction that does not increase tension stress relatively. Accordingly, it is possible to reduce the tension stress and the bending moment generated at the tip-side center part region between the first edge and the second edge. Further, it is possible to enhance the feasibility in term of strength even in a case where the 3D blade is curved considerably.

(6) In an embodiment, in any one of the above configurations (2) to (5), the first reference line is configured such that, when an angle $\theta_1$ between a first tangent to each point on the first reference line and a radial-directional line passing the point is defined such that a sign of the angle $\theta_1$ is positive when the first tangent extending radially outward from the point is positioned downstream of the radial-directional line in the rotational direction, the angle $\theta_1$ has a maximum value of not smaller than 20 degrees.

With the above configuration (6), the maximum value of the angle $\theta_1$ is not smaller than 20 angular degrees, and thus it is possible to deform the side of the first edge in a direction opposite from the side of the second edge, that is, in a direction that does not increase the tension stress. Accordingly, it is possible to reduce tension stress and bending moment reliably.

(7) In an embodiment, in any one of the above configurations (1) to (6), the impeller is configured such that, when a second radial-directional cross section is a cross section of the impeller at an axial-directional position passing a tip of the second edge, at least a part of the second radial-directional cross section in a blade-height range of 50% or more is inclined upstream in the rotational direction of the impeller with respect to the radial direction.

With the above configuration (7), at least a part of the second radial-directional cross section of the second edge is inclined toward the upstream side of the rotational direction of the impeller with respect to the radial direction in the blade height range of not less than 50%, and thus it is possible to deform the side of the first edge and the side of the second edge at the side of the hub large-diameter portion in a direction that does not increase tension stress relatively upon rotation of the impeller. Accordingly, it is possible to reduce the tension stress and the bending moment generated at the tip-side center part region between the first edge and the second edge.

(8) In an embodiment, in the above configuration (7), when, on a second reference line connecting midpoints of the second radial-directional cross section in a blade thickness direction, a second hub-side reference point is defined as a radial-directional position of a hub surface of the hub and a second tip-side reference point is defined as a radial-directional position of the tip, the second-tip side reference point is positioned upstream of the second hub-side reference point in the rotational direction.

With the above configuration (8), the second tip-side reference point of the second edge is positioned upstream of the second-hub side reference point in the rotational direction, and thus it is possible to displace the side of the second edge toward the upstream side in the rotational direction upon rotation of the impeller. Accordingly, it is possible to reduce the tension stress and the bending moment generated at the tip-side center part region between the first edge and the second edge.

(9) In an embodiment, in the above configuration (8), the second reference line includes a curved portion which has a curvature center at an upstream side in the rotational direction in the second radial-directional cross section.

With the above configuration (9), the curvature center of the curved portion is positioned at the upstream side with respect to the rotational direction of the impeller, and thus it is possible to displace the side of the second edge toward the upstream side with respect to the rotational direction upon rotation of the impeller. Accordingly, it is possible to reduce the tension stress and the bending moment generated at the tip-side center part region between the first edge and the second edge.

(10) In an embodiment, in the above configuration (8) or (9), the second reference line includes a linear portion.

With the above configuration (10), with the second reference line including the linear portion, it is possible to simplify the shape of the curved surface of the blade, and thus the blade can be produced more easily.

(11) In an embodiment, in any one of the above configurations (8) to (10), a phase angular difference $\Delta\theta_2$ between the second tip-side reference point and the second hub-side reference point is not smaller than 20 angular degrees.

With the above configuration (11), by inclining at least the tip side of the second radial-directional cross section in the direction described in the above configuration (7) and ensuring the above phase angular difference $\Delta\theta_2$, it is possible to deform the side of the first edge and the side of the second edge at the side of the hub large-diameter portion in a direction that does not increase tension stress relatively upon rotation of the impeller. Accordingly, it is possible to reduce the tension stress and the bending moment generated at the tip-side center part region between the first edge and the second edge. Further, it is possible to enhance the feasibility in term of strength even in a case where the 3D blade is curved considerably.

(12) In an embodiment, in any one of the above configurations (8) to (11), the second reference line is configured such that, when an angle $\theta_2$ between a second tangent to each point on the second reference line and a radial-directional line passing the point is defined such that a sign of the angle $\theta_2$ is positive when the second tangent extending radially outward from the point is positioned upstream of the radial-directional line in the rotational direction, the angle $\theta_2$ has a maximum value of not smaller than 30 degrees.

With the above configuration (12), the maximum value of the angle $\theta_2$ is not smaller than 30 angular degrees, and thus it is possible to deform the side of the second edge in a direction opposite to the side of the first edge, that is, in a direction that does not increase the tension stress. Accordingly, it is possible to reduce the tension stress and the bending moment reliably.

(13) In an embodiment, a centrifugal turbomachine includes: the impeller according to any one of (1) to (12); and a casing disposed so as to cover the impeller.

With the above configuration (13), thanks to the centrifugal force that is applied upon rotation of the impeller, the side of the first edge and the side of the second edge can deform in a direction that does not increase tension stress relatively. Accordingly, it is possible to reduce the tension stress and the bending moment generated at the tip-side center part region between the first edge and the second edge.

(14) In an embodiment, in the above configuration (13), the impeller includes: a leading edge being the first edge; and a trailing edge being the second edge. The centrifugal turbomachine is a centrifugal compressor.

With the above configuration (14), when the centrifugal turbomachine is a centrifugal compressor, it is possible to reduce tension stress and bending moment that occur in the center part region of the blade upon rotation of the impeller.

Advantageous Effects

According to some embodiments, it is possible to reduce tension stress and bending moment that occur in the center part region at the tip side of the blade upon rotation of the impeller.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 10:
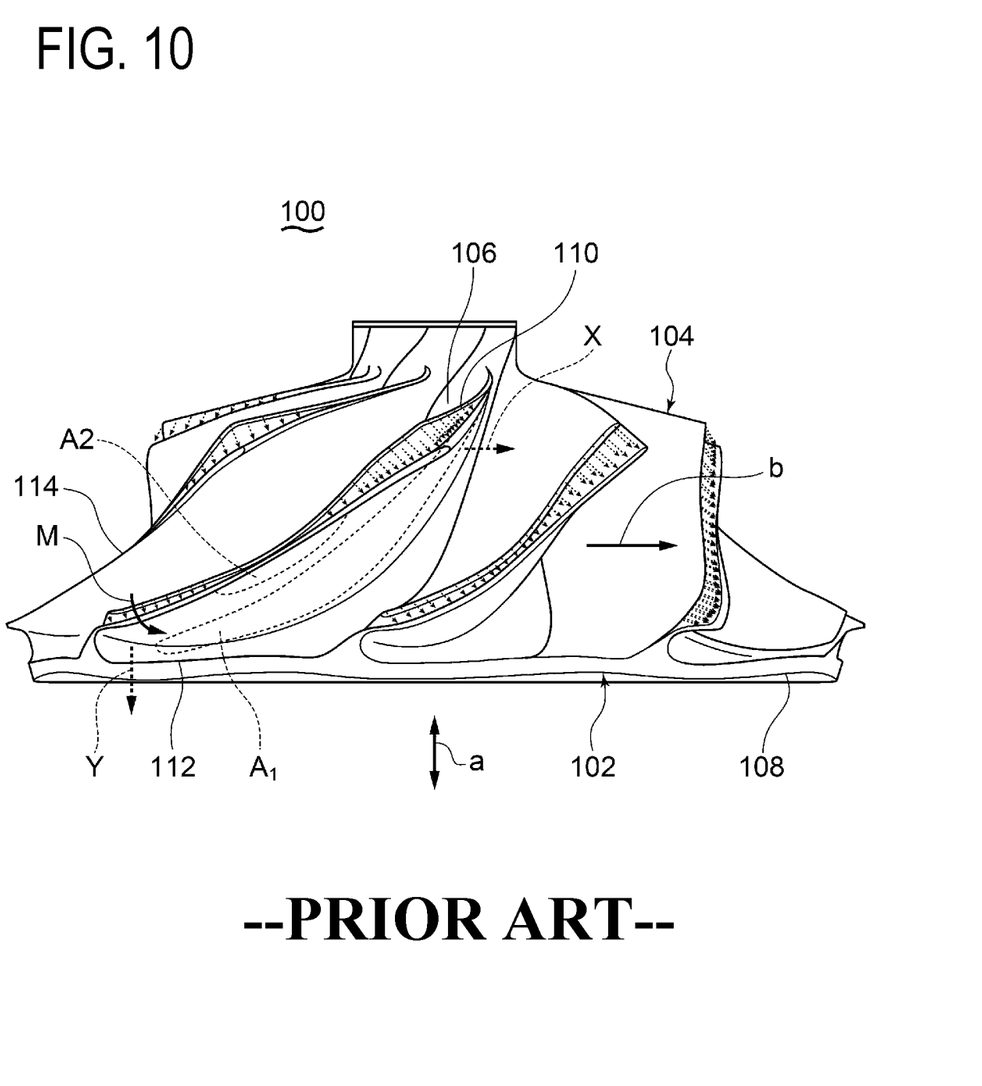
FIG. 10 is a side view of a typical impeller.
Figure 11:
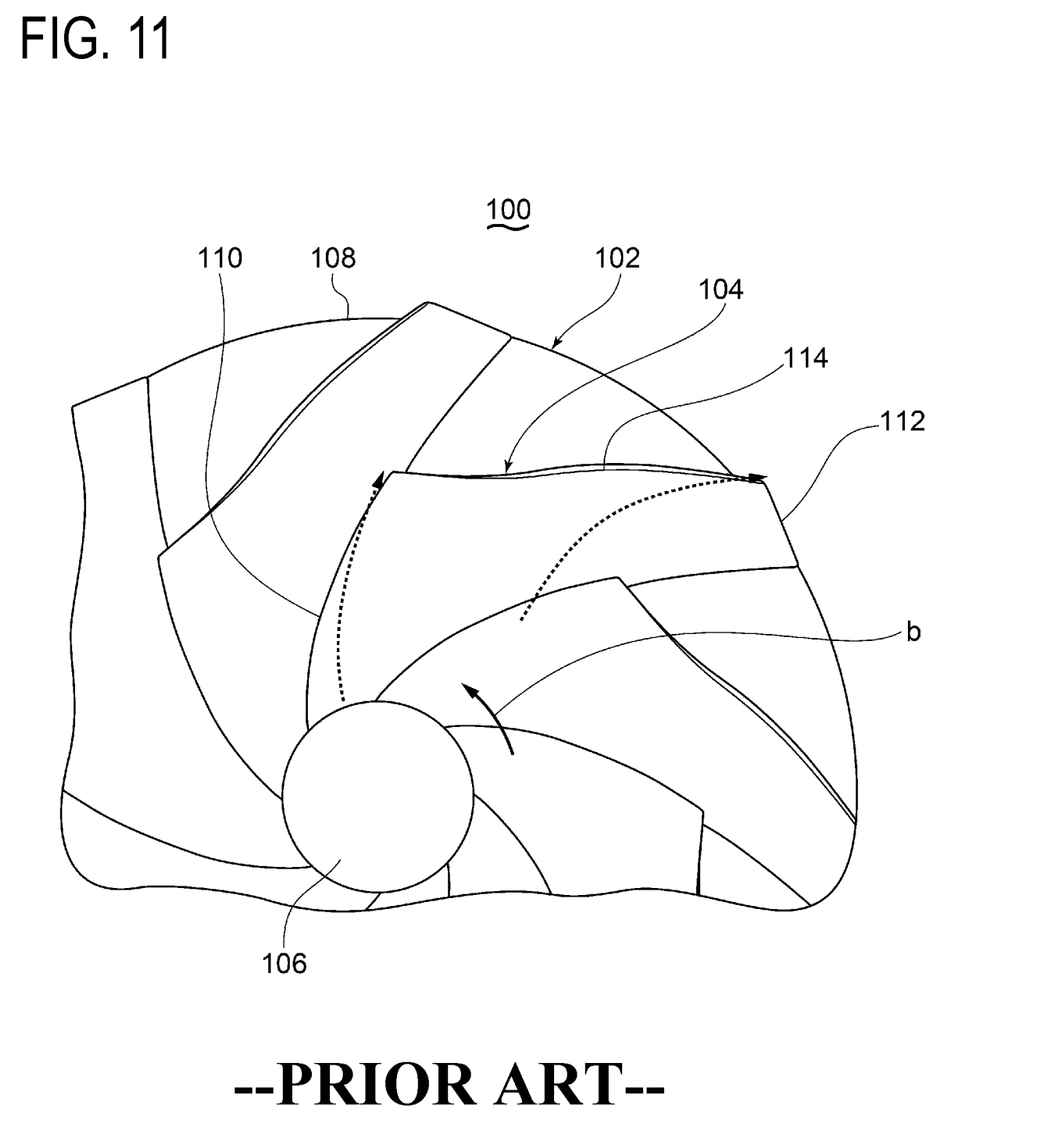
FIG. 11 is a front view of a typical impeller.

FIGS. 10 and 11 are diagrams showing an impeller of a typical centrifugal compressor.

In FIGS. 10 and 11, the impeller 100 for a typical centrifugal compressor includes a hub portion 102 and a plurality of blades 104 disposed on the outer peripheral surface of the hub portion 102. The hub portion 102 has a small-diameter portion 106 disposed on an end portion in the axial direction 'a' and a large-diameter portion 108 positioned on the other end portion in the axial direction 'a'. The large-diameter portion 108 has a greater diameter than the small-diameter portion 106. The blade 104 has a leading edge 110 positioned at the axial-directional position of the small-diameter portion 106, and a trailing edge 112 positioned at the axial-directional position of the large-diameter portion 108. In the drawings, 'b' indicates the rotational direction of the impeller 100.

As depicted in FIG. 11, the leading edge 110 and the trailing edge 112 are inclined toward the downstream side of the rotational direction with respect to the radial direction.

As depicted in FIG. 10, it is generally known that a high centrifugal stress occurs near the mean height position $A_1$ of the blade 104 when the impeller 100 rotates.

As a result of analysis by the present inventors and the like, it was found that deformation of the blade 104 due to the centrifugal force is greater at the side of the leading edge and at the side of the trailing edge, while the leading-edge side deforms in a direction that mitigates the circumferential-directional inclination of the blade 104 (direction of arrow X toward the downstream side of the rotational direction 'b'), and the trailing-edge side deforms rather from the upper side toward the lower side (in the direction of arrow Y from the leading edge toward the trailing edge). As a result, tension stress and bending moment M are generated at the tip-side region center part $A_2$ of the blade chord 114 of the blade 104.

Typically, blades of a centrifugal turbomachine have been mainly linear blades (blades whose leading edges extend linearly along the radial direction), but 3D machining has become possible in recent years. Thus, the present inventors conducted researches on 3D blades and invented a 3D shape whose leading edge is curved toward the upstream side of the rotational direction with respect to the radial direction. However, as described above, it was found that tension stress is applied to the tip-side region center part $A_2$ of the rotor blade tip.

Figure 1:
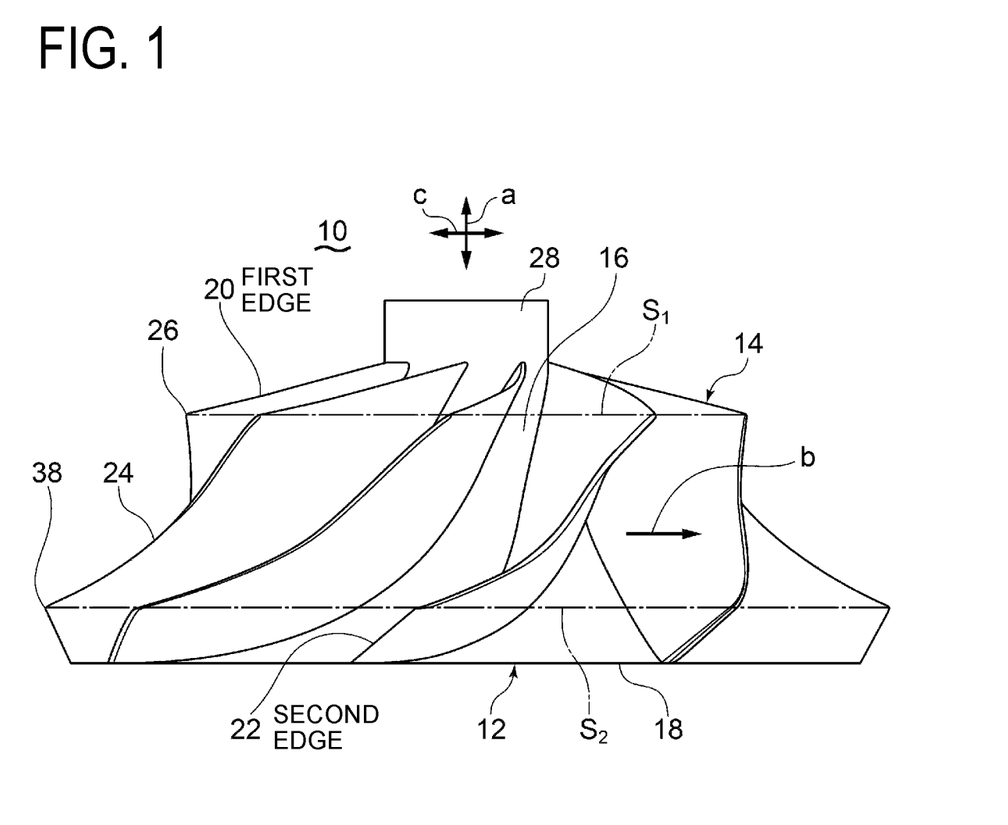
FIG. 1 is a side view of an impeller according to an embodiment.
Figure 2:
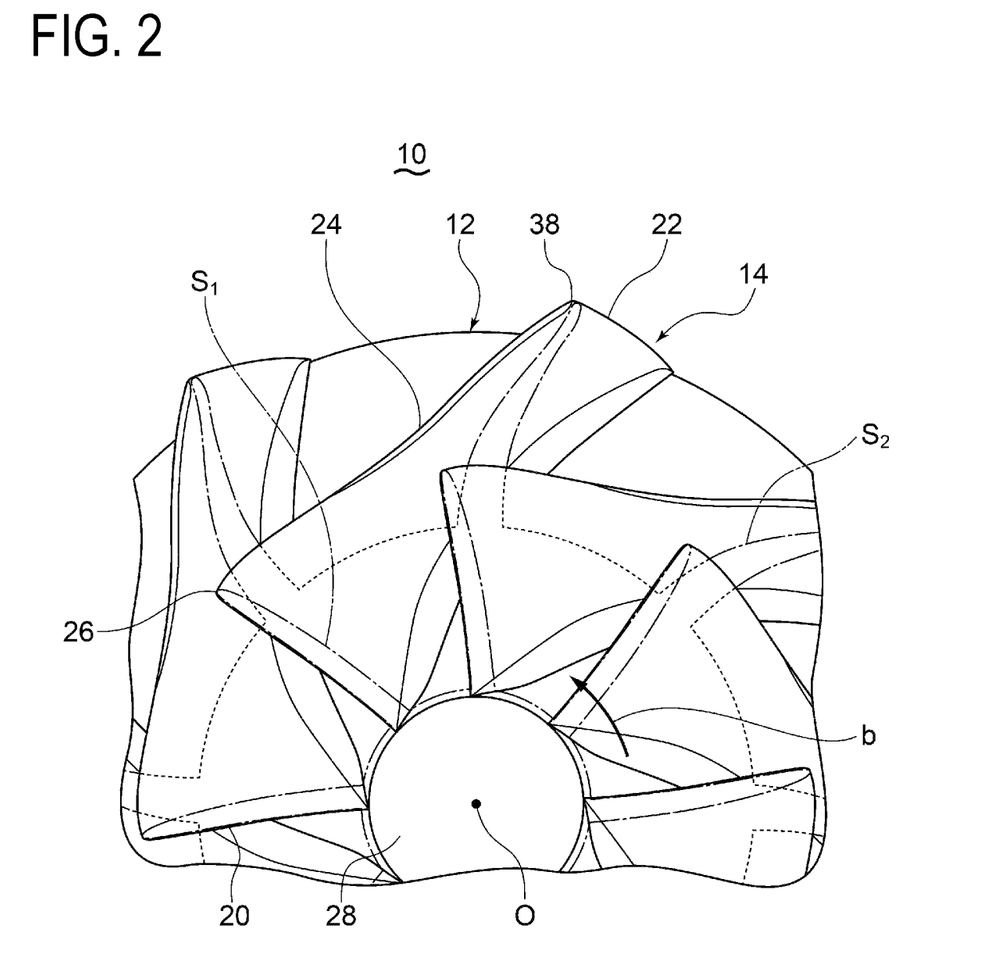
FIG. 2 is a front view of an impeller according to an embodiment.
Figure 3:
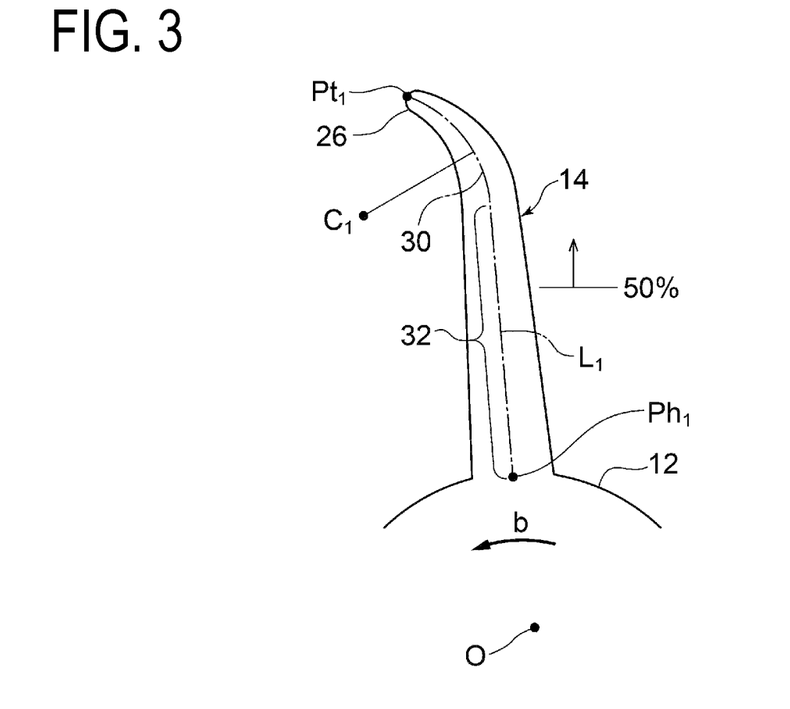
FIG. 3 is a front view of the blade shape of an impeller according to an embodiment.

FIGS. 1 to 3 are diagrams showing the impeller 10 of a centrifugal turbomachine according to an embodiment. FIG. 1 is a side view of the impeller 10, FIG. 2 is a front view of the impeller 10, and FIG. 3 is a front view of the shape of a blade 14 of the impeller 10 in the first radial-directional cross section $S_1$ described below.

In FIGS. 1 and 2, the impeller 10 includes a hub portion 12 and a plurality of blades 14 disposed on the outer peripheral surface of the hub portion 12. The hub portion 12 has a small-diameter portion 16 disposed on an end portion in the axial direction 'a' and a large-diameter portion 18 positioned on the other end portion in the axial direction 'a'. The large-diameter portion 18 has a greater diameter than the small-diameter portion 16. The blade 14 has a first edge 20 positioned at the axial-directional position of the small-diameter portion 16, and a second edge 22 positioned at the axial-directional position of the large-diameter portion 18.

As depicted in FIG. 3, the impeller 10 is configured such that, when the first radial-directional cross section $S_1$ is a cross section of the impeller 10 at the axial-directional position passing the tip 26 of the first edge 20, at least a part of the first radial-directional cross section $S_1$ in the blade height range of 50% or more of the blade height is inclined toward the downstream side of the rotational direction 'b' of the impeller 10 with respect to the radial direction 'c'.

With the above configuration, as depicted in FIG. 2, at least a part of the radial-directional cross section $S_1$ is inclined toward the downstream side of the rotational direction 'b' with respect to the radial direction 'c' in the blade height range of not less than 50%, and thus it is possible to deform the side of the first edge and the side of the second edge in a direction that does not increase tension stress relatively, even in a case where the second edge 22 at the side of the hub large-diameter portion is inclined toward the upstream side of the rotational direction with respect to the radial direction 'c'. Specifically, the side of the first edge and the side of the second edge are displaced in a direction that the side of the first edge and the side of the second edge relatively approach one another, or in a direction that generates compression stress on the tip-side region center part $A_2$. Accordingly, it is possible to reduce the tension stress and the bending moment M generated at the tip-side region center part $A_2$ between the first edge 20 and the second edge 22.

In an embodiment, in FIGS. 1 and 2, the impeller 10 has a rotational axis 28 at the center of the hub portion 12, and the rotational axis 28 rotates in the direction of arrow 'b' about the rotational center O.

Figure 4:
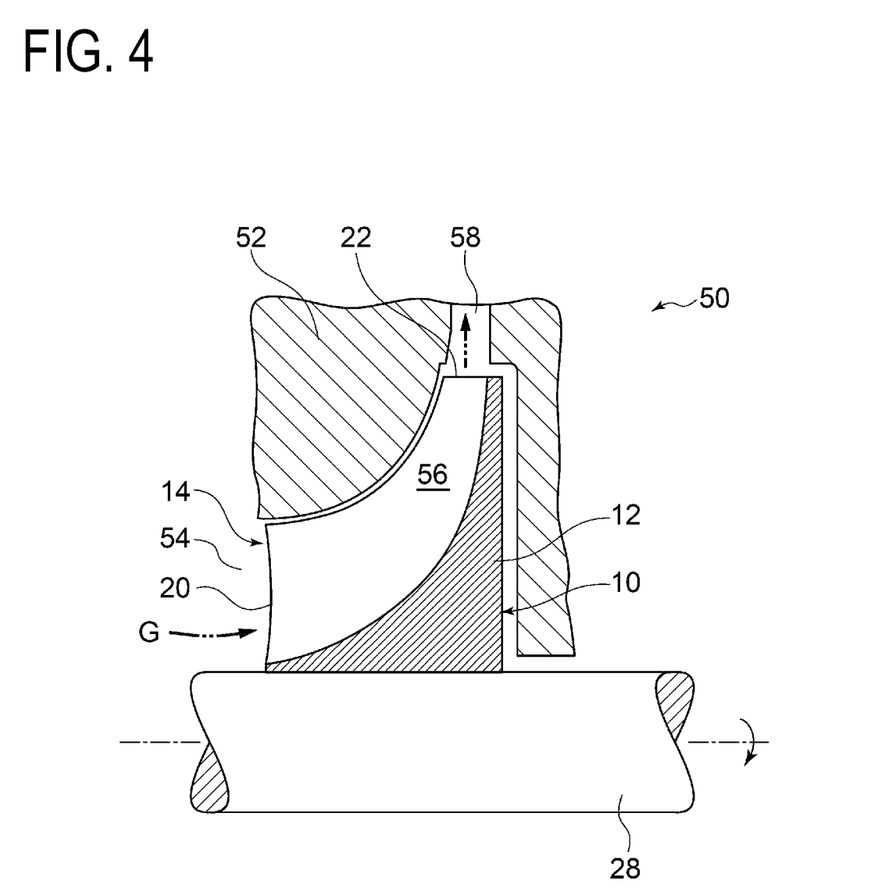
FIG. 4 is a side cross-sectional view of a centrifugal turbomachine according to an embodiment.

The centrifugal turbomachine 50 according to an embodiment includes, as depicted in FIG. 4, an impeller 10 having the above configuration, and a casing 52 disposed so as to cover the impeller 10.

With the above configuration, thanks to the centrifugal force that is applied to the blade 14 upon rotation of the impeller 10, the side of the first edge 20 and the side of the second edge 22 of the blade 14 can deform in a direction that does not increase tension stress relatively. Accordingly, it is possible to reduce the tension stress and the bending moment M generated at the tip-side region center part $A_2$ between the first edge 20 and the second edge 22.

In an embodiment, the centrifugal turbomachine 50 is a centrifugal compressor, and the impeller 10 includes a blade 14 having a leading edge being the first edge 20 and a trailing edge being the second edge 22. As the impeller 10 rotates, to-be-compressed gas G passes through a flow passage 56 formed between the blades from an intake passage 54, becomes compressed, and is discharged to a discharge passage 58.

According to the present embodiment, upon rotation of the impeller 10, it is possible to reduce tension stress and bending moment M that occur at the tip-side region center part $A_2$ between the leading edge and the trailing edge.

In an embodiment, as depicted in FIG. 3, on the first reference line L1 that connects midpoints of the first radial-directional cross section $S_1$ in the blade thickness direction, when the first hub-side reference point $Ph_1$ is the point positioned at the radial-directional position of the hub surface of the hub portion 12 and the first tip-side reference point $Pt_1$ is the point positioned at the radial-directional position at the tip 26, the tip-side reference point $Pt_1$ is positioned downstream of the first hub-side reference point $Ph_1$ with respect to the rotational direction 'b' of the impeller 10.

According to the present embodiment, the first tip-side reference point $Pt_1$ is positioned downstream of the first-hub side reference point $Ph_1$ with respect to the rotational direction of the impeller 10, and thus it is possible to deform the side of the first edge 20 and the side of the second edge 22 in the above described direction that does not increase tension stress relatively. Accordingly, it is possible to reduce the tension stress and the bending moment M generated at the tip-side region center part A2 between the first edge 20 and the second edge 22.

In an embodiment, as depicted in FIG. 3, the first reference line $L_1$ includes a curved portion 30 having a curvature center $C_1$ at the downstream side of the first reference line $L_1$ in the rotational direction 'b' of the impeller 10, in the first radial-directional cross section $S_1$.

According to the present embodiment, the curvature center $C_1$ of the curved portion 30 is positioned at the downstream side with respect to the rotational direction of the impeller 10, and thus it is possible to deform the side of the first edge 20 and the side of the second edge 22 in a direction that does not increase tension stress relatively. Accordingly, it is possible to reduce the tension stress and the bending moment M generated at the tip-side region center part A2 between the first edge 20 and the second edge 22.

In an embodiment, as depicted in FIG. 3, the first reference line $L_1$ includes a linear portion 32.

According to the present embodiment, with the first reference line $L_1$ including the linear portion 32, it is possible to simplify the shape of the curved surface of the blade 14, and thus the blade 14 can be produced more easily.

Figure 5:
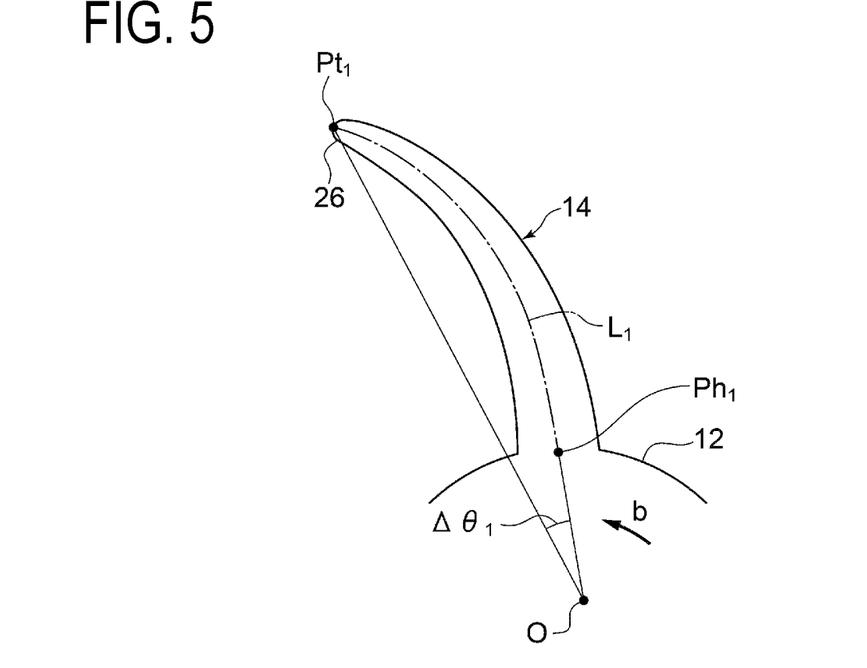
FIG. 5 is a front view of the blade shape of an impeller according to an embodiment.
Figure 6:
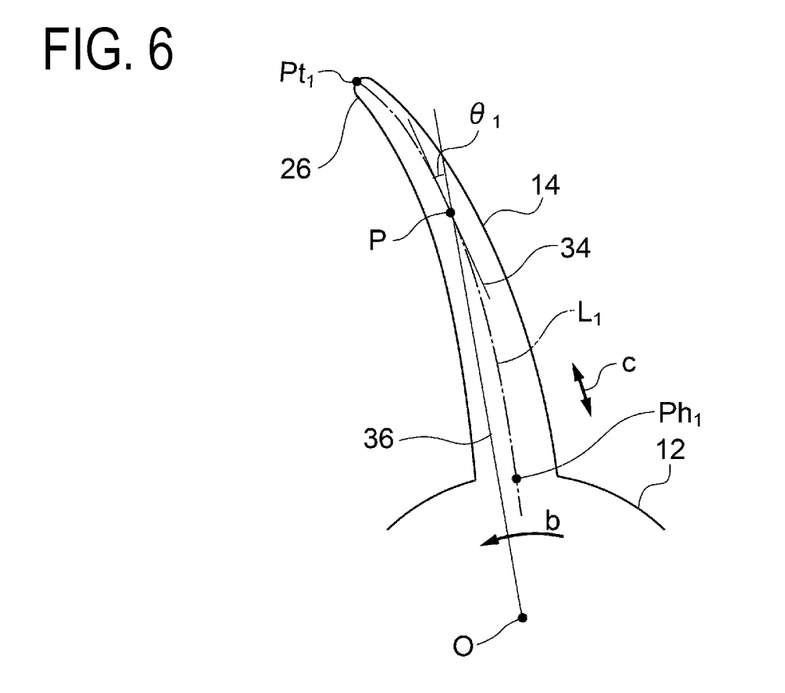
FIG. 6 is a front view of the blade shape of an impeller according to an embodiment.

FIGS. 5 and 6 are diagrams showing the shape of the blade 14 in the first radial-directional cross section $S_1$ according to each embodiment.

In an embodiment, as depicted in FIG. 5, the phase angular difference $\Delta\theta_1$ between the first tip-side reference point $Pt_1$ and the first hub-side reference point $Ph_1$ is not smaller than 20 angular degrees.

According to the present embodiment, by inclining at least the tip side of the first radial-directional cross section $S_1$ toward the downstream side in the rotational direction of the impeller 10 and ensuring the above phase angular difference $\Delta\theta_1$, it is possible to deform the side of the first edge and the side of the second edge in a direction that does not increase tension stress relatively. Accordingly, it is possible to reduce the tension stress and the bending moment M generated at the tip-side region center part A2 between the first edge 20 and the second edge 22. Further, it is possible to enhance the feasibility in term of strength even in a case where the 3D blade is curved considerably.

In an embodiment, as depicted in FIG. 6, the first reference line $L_1$ is configured such that, when the angle $\theta_1$ between the first tangent 34 to each point to the first reference line and the radial-directional line 36 passing the point on the first reference line is defined such that the sign of the angle $\theta_1$ is positive when the first tangent 34 extending radially outward from the point is positioned downstream of the radial-directional line 36 in the rotational direction 'b', the angle $\theta_1$ has a maximum value of not smaller than 20 degrees.

According to the present embodiment, the maximum value of the angle $\theta_1$ is not smaller than 20 angular degrees, and thus it is possible to deform the side of the first edge 20 with respect to the second edge 22 in a direction that does not increase the tension stress reliably. Accordingly, it is possible to reduce tension stress and bending moment M reliably.

Figure 7:
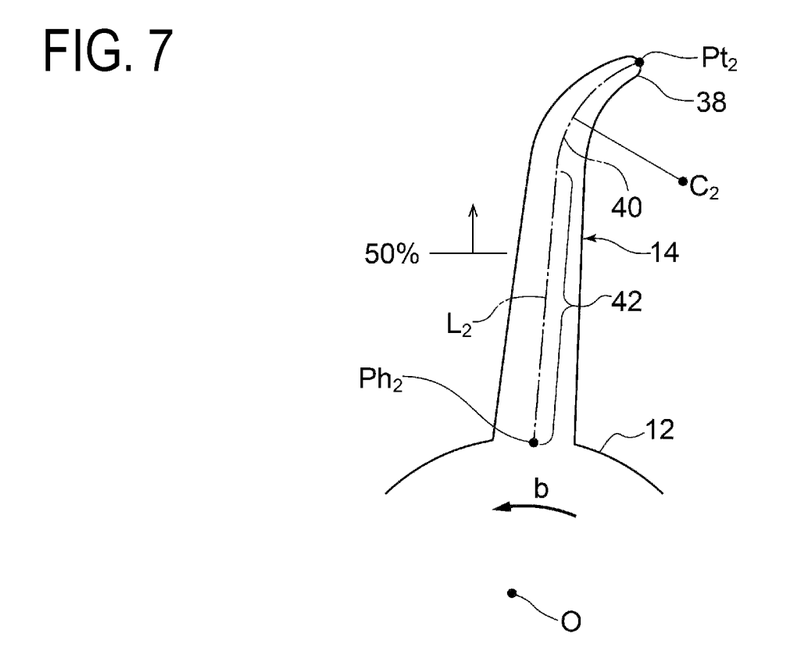
FIG. 7 is a front view of the blade shape of an impeller according to an embodiment.
Figure 8:
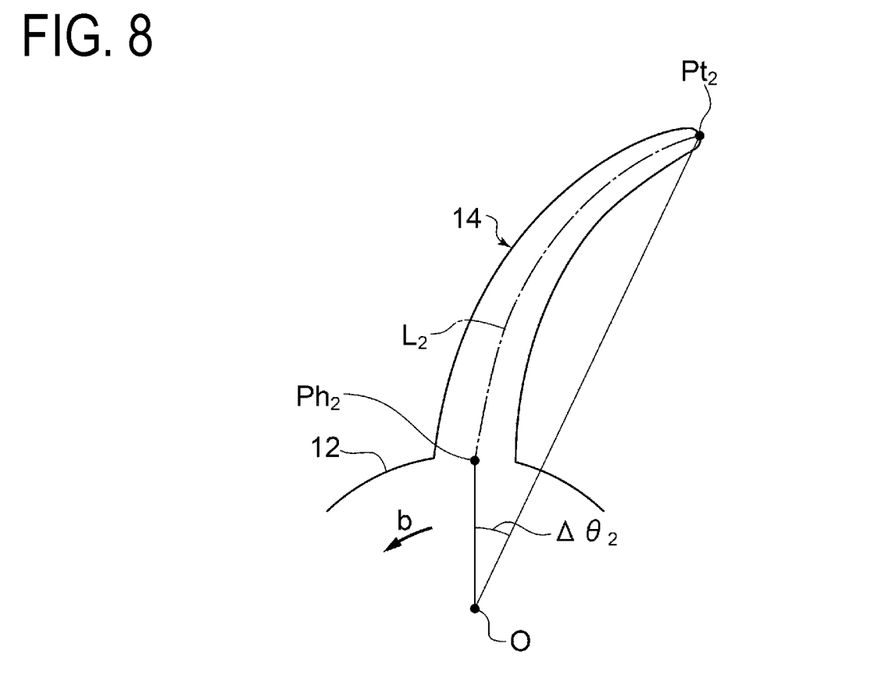
FIG. 8 is a front view of the blade shape of an impeller according to an embodiment.
Figure 9:
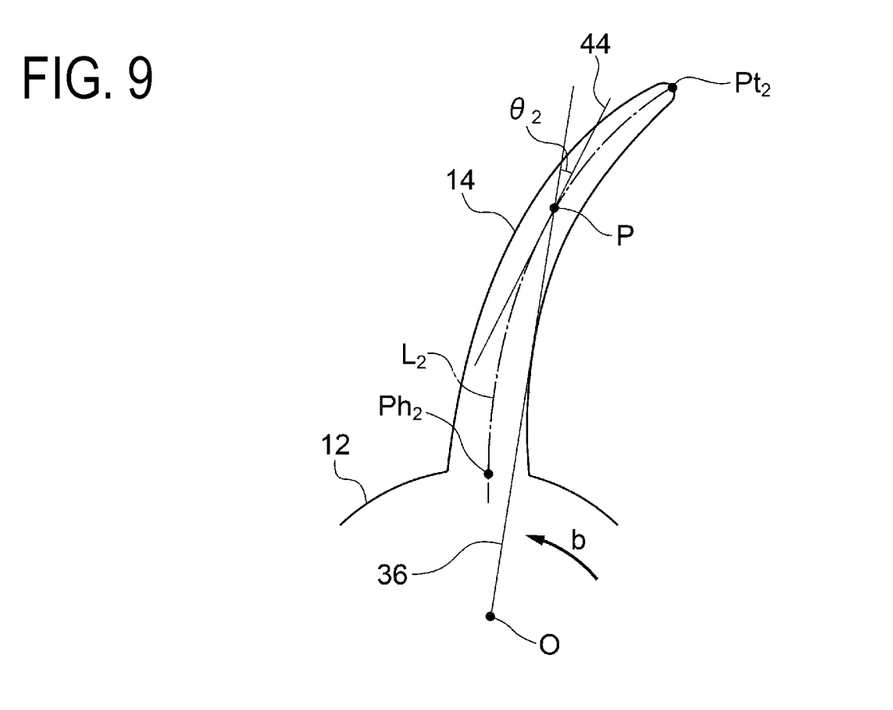
FIG. 9 is a front view of the blade shape of an impeller according to an embodiment.

FIGS. 7 to 9 are diagrams showing the shape of the blade 14 in the second radial-directional cross section $S_2$ described below according to each embodiment.

In an embodiment, as depicted in FIG. 7, the impeller 10 is configured such that, when the second radial-directional cross section $S_2$ is a cross section of the impeller 10 at the axial-directional position passing the tip 38 of the second edge 22 (see FIG. 1), at least a part of the second radial-directional cross section $S_2$ in the blade height range of 50% or more of the blade height is inclined toward the upstream side of the rotational direction 'b' of the impeller with respect to the radial direction.

According to the present embodiment, it is possible to deform the side of the first edge 20 and the side of the second edge 22 in a direction that does not increase tension stress relatively upon rotation of the impeller 10. That is, the side of the first edge and the side of the second edge are displaced in a direction that the edges relatively approach one another, or in a direction that generates compression stress on the tip-side region center part A2.

Accordingly, it is possible to reduce the tension stress and the bending moment M generated at the tip-side region center part $A_2$ between the first edge 20 and the second edge 22.

In an embodiment, as depicted in FIG. 7, on the second reference line $L_2$ that connects midpoints of the second radial-directional cross section $S_2$ in the blade thickness direction, when the second hub-side reference point $Ph_2$ is the point positioned at the radial-directional position of the hub surface of the hub portion 12 and the second tip-side reference point $Pt_2$ is the point positioned at the radial-directional position of the tip 38, the tip-side reference point $Pt_2$ is positioned upstream of the second hub-side reference point $Ph_2$ with respect to the rotational direction 'b' of the impeller 10.

According to the present embodiment, the second tip-side reference point $Pt_2$ of the second edge 22 is positioned upstream of the second hub-side reference point $Ph_2$ with respect to the rotational direction, and thus it is possible to displace the side of the second edge 22 toward the upstream side in the rotational direction upon rotation of the impeller 10. Accordingly, it is possible to reduce the tension stress and the bending moment M generated at the tip-side region center part A2 between the first edge 20 and the second edge 22.

In an embodiment, as depicted in FIG. 7, the second reference line $L_2$ includes a curved portion 40 having a curvature center $C_2$ at the upstream side in the rotational direction 'b' of the impeller 10, in the second radial-directional cross section $S_2$.

According to the present embodiment, the curvature center $C_2$ of the curved portion 40 is positioned at the upstream side with respect to the rotational direction of the impeller 10, and thus it is possible to displace the side of the second edge 22 toward the upstream side with respect to the rotational direction upon rotation of the impeller 10. Accordingly, it is possible to reduce the tension stress and the bending moment M generated at the tip-side region center part A2 between the first edge 20 and the second edge 22.

In an embodiment, as depicted in FIG. 7, the second reference line $L_2$ includes a linear portion 42.

According to the present embodiment, with the second reference line $L_2$ including the linear portion 42, it is possible to simplify the shape of the curved surface shape of the blade 14, and thus the blade 14 can be produced more easily.

In an embodiment, as depicted in FIG. 8, the phase angular difference $\Delta\theta_2$ between the second tip-side reference point $Pt_2$ and the second hub-side reference point $Ph_2$ is not smaller than 20 angular degrees.

According to the present embodiment, by inclining at least the tip side of the second radial-directional cross section $S_2$ toward the upstream side in the rotational direction of the impeller 10 and ensuring the above phase angular difference $\Delta\theta_2$ that is not smaller than 20 angular degrees, it is possible to deform the side of the first edge 20 and the side of the second edge 22 in a direction that does not increase tension stress relatively upon rotation of the impeller 10. Accordingly, it is possible to reduce the tension stress and the bending moment M generated at the tip-side region center part A2 between the first edge 20 and the second edge 22. Further, it is possible to enhance the feasibility in term of strength even in a case where the 3D blade is curved considerably.

In an embodiment, as depicted in FIG. 9, the second reference line $L_2$ is configured such that, when the angle $\theta_2$ between the second tangent 44 to each point P on the second reference line and the radial-directional line 36 passing the point P is defined such that the sign of the angle $\theta_2$ is positive when the second tangent 44 extending radially outward from the point P is positioned upstream of the radial-directional line 36 in the rotational direction 'b', the angle $\theta_2$ has a maximum value of not smaller than 30 degrees.

According to the present embodiment, the maximum value of the angle $\theta_2$ is not smaller than 30 angular degrees, and thus it is possible to deform the side of the second edge 22 with respect to the first edge 20 in a direction that does not increase the tension stress reliably. Accordingly, it is possible to reduce tension stress and bending moment M reliably.

In an embodiment, when the angle $\Delta\theta_1$ and the angle $\Delta\theta_2$ are substantially the same, it is possible to maximize the effect to reduce the tension stress and the bending moment M generated at the tip-side region center part A2 between the first edge 20 and the second edge 22.

INDUSTRIAL APPLICABILITY

According to some embodiments, it is possible to reduce tension stress and bending moment that occur at the blade tip side of the blade of the impeller of a centrifugal turbomachine, such as a turbocharger for automobiles and ships, a gas turbine, or a steam turbine, for instance.

REFERENCE SIGNS LIST 10, 100 Impeller
12, 102 Hub portion 14, 104 Blade
16, 106 Small-diameter portion
18, 108 Large-diameter portion
20 First edge
22 Second edge
24, 114 Blade chord
26, 38 Tip
28 Rotational axis
30, 40 Curved portion
32, 42 Linear portion
34 First tangent
36 Radial-directional line
44 Second tangent
50 Centrifugal turbomachine
52 Casing
54 Intake passage
56 Flow passage
58 Discharge passage
110 Leading edge
112 Trailing edge
$A_2$ Tip-side region center part
$L_1$ First reference line
$L_2$ Second reference line
M Bending moment
$Ph_1$ First hub-side reference point
$Ph_2$ Second hub-side reference point
$Pt_1$ First tip-side reference point
$Pt_2$ Second tip-side reference point
$S_1$ First radial-directional cross section
$S_2$ Second radial-directional cross section
a Axial direction
b Rotational direction
c Radial direction
$\Delta\theta_1, \Delta\theta_2$ Phase angular difference

The invention claimed is:

1. An impeller for a centrifugal compressor, comprising:
a hub having a small-diameter portion positioned at a first end portion in an axial direction and a large-diameter portion positioned at a second end portion in the axial direction, the large-diameter portion having a greater diameter than the small-diameter portion; and
a plurality of blades disposed on an outer peripheral surface of the hub,
wherein the plurality of blades includes:
two or more blades each of which has a first edge positioned at an axial-directional position of the small-diameter portion so as to define an inlet for to-be-compressed gas flowing into the impeller and a second edge positioned at an axial-directional position of the large-diameter portion,
wherein for each of the two or more blades:
the blade has a first radial-directional cross section which is a cross section orthogonal to the axial direction at an axial-directional position passing a tip of the first edge and a portion of the blade disposed on a radially-inner side of the tip, at least a part of the portion of the blade disposed on the radially-inner side of the tip included in the first radial-directional cross section in a blade-height range of 50% or more being inclined downstream in a rotational direction of the impeller with respect to a radial direction,
wherein the first radial-directional cross section includes:
a first hub-side reference point which is a radial-directional position of the blade at the hub on a first reference line connecting midpoints of the first radial-directional cross section in a blade thickness direction; and
a first tip-side reference point which is a radial-directional position of the tip on the first reference line and is positioned downstream of the first hub-side reference point in the rotational direction, and
wherein, for each of the two or more blades, the first reference line includes a curved portion which has a curvature center at a downstream side, in the rotational direction of the first radial-directional cross section.

2. The impeller according to claim 1,
wherein, for each of the two or more blades, the first reference line includes a linear portion.

3. The impeller according to claim 1,
wherein, for each of the two or more blades, the first reference line is configured such that:
when an angle $\theta_1$ between a first tangent to a respective midpoint of the first reference line and a radial-directional line passing the respective midpoint is defined such that a sign of the angle $\theta_1$ is positive when the first tangent extending radially outward from the respective midpoint is positioned downstream of the radial-directional line in the rotational direction, and
the angle $\theta_1$ has a maximum value of not smaller than 20 degrees.

4. The impeller according to claim 1,
wherein, for each of the two or more blades, when, on a second reference line connecting midpoints of the second radial-directional cross section in a blade thickness direction, a second hub-side reference point is defined as a radial-directional position of the blade at the hub and a second tip-side reference point is defined as a radial-directional position of the tip at the second edge,
the second-tip side reference point is positioned upstream of the second hub-side reference point in the rotational direction.

5. A centrifugal turbomachine, comprising:
the impeller according to claim 1; and
a casing disposed so as to cover the impeller.

6. The centrifugal turbomachine according to claim 5,
wherein the first edges are leading edges,
wherein the second edges are trailing edges, and
wherein the centrifugal turbomachine is a centrifugal compressor.

7. An impeller for a centrifugal compressor, comprising:
a hub having a small-diameter portion positioned at a first end portion in an axial direction and a large-diameter portion positioned at a second end portion in the axial direction, the large-diameter portion having a greater diameter than the small-diameter portion; and
a plurality of blades disposed on an outer peripheral surface of the hub,
wherein the plurality of blades includes:
two or more blades each of which has a first edge positioned at an axial-directional position of the small-diameter portion so as to define an inlet for to-be-compressed gas flowing into the impeller and a second edge positioned at an axial-directional position of the large-diameter portion,
wherein for each of the two or more blades:
the blade has a first radial-directional cross section which is a cross section orthogonal to the axial direction at an axial-directional position passing a tip of the first edge and a portion of the blade disposed on a radially-inner side of the tip, at least a part of the portion of the blade disposed on the radially-inner side of the tip included in the first radial-directional cross section in a blade-height range of 50% or more being inclined downstream in a rotational direction of the impeller with respect to a radial direction,
wherein the first radial-directional cross section includes:
a first hub-side reference point which is a radial-directional position of the blade at the hub on a first reference line connecting midpoints of the first radial-directional cross section in a blade thickness direction; and
a first tip-side reference point which is a radial-directional position of the tip on the first reference line and is positioned downstream of the first hub-side reference point in the rotational direction, and
wherein, for each of the two or more blades, a phase angular difference $\Delta\theta_1$ between the first tip-side reference point and the first hub-side reference point is not smaller than 20 angular degrees.

8. An impeller for a centrifugal compressor, comprising:
a hub having a small-diameter portion positioned at a first end portion in an axial direction and a large-diameter portion positioned at a second end portion in the axial direction, the large-diameter portion having a greater diameter than the small-diameter portion; and
a plurality of blades disposed on an outer peripheral surface of the hub,
wherein the plurality of blades includes:
two or more blades each of which has a first edge positioned at an axial-directional position of the small-diameter portion so as to define an inlet for to-be-compressed gas flowing into the impeller and a second edge positioned at an axial-directional position of the large-diameter portion,
wherein for each of the two or more blades:
the blade has a first radial-directional cross section which is a cross section orthogonal to the axial direction at an axial-directional position passing a tip of the first edge and a portion of the blade disposed on a radially-inner side of the tip, at least a part of the portion of the blade disposed on the radially-inner side of the tip included in the first radial-directional cross section in a blade-height range of 50% or more being inclined downstream in a rotational direction of the impeller with respect to a radial direction; and
the blade has a second radial-directional cross section which is a cross section orthogonal to the axial direction at an axial-directional position passing a tip of the second edge, at least a part of the second radial-directional cross section in a blade-height range of 50% or more being inclined upstream in the rotational direction of the impeller with respect to the radial direction,
wherein, for each of the two or more blades, when, on a second reference line connecting midpoints of the second radial-directional cross section in a blade thickness direction, a second hub-side reference point is defined as a radial-directional position of the blade at the hub and a second tip-side reference point is defined as a radial-directional position of the tip at the second edge, and
the second-tip side reference point is positioned upstream of the second hub-side reference point in the rotational direction,
wherein, for each of the two or more blades, the second reference line includes a curved portion which has a curvature center at an upstream side, in the rotational direction of the second radial-directional cross section.

9. The impeller according to claim 8,
wherein, for each of the two or more blades, the second reference line includes a linear portion.

10. The impeller according to claim 8,
wherein, for each of the two or more blades, the second reference line is configured such that:
when an angle $\theta_2$ between a second tangent to a respective midpoint of the second reference line and a radial-directional line passing the respective midpoint is defined such that a sign of the angle $\theta_2$ is positive when the second tangent extending radially outward from the respective midpoint is positioned upstream of the radial-directional line in the rotational direction; and
the angle $\theta_2$ has a maximum value of not smaller than 30 degrees.

11. An impeller for a centrifugal compressor, comprising:
a hub having a small-diameter portion positioned at a first end portion in an axial direction and a large-diameter portion positioned at a second end portion in the axial direction, the large-diameter portion having a greater diameter than the small-diameter portion; and
a plurality of blades disposed on an outer peripheral surface of the hub,
wherein the plurality of blades includes:
two or more blades each of which has a first edge positioned at an axial-directional position of the small-diameter portion so as to define an inlet for to-be-compressed gas flowing into the impeller and a second edge positioned at an axial-directional position of the large-diameter portion,
wherein for each of the two or more blades:
the blade has a first radial-directional cross section which is a cross section orthogonal to the axial direction at an axial-directional position passing a tip of the first edge and a portion of the blade disposed on a radially-inner side of the tip, at least a part of the portion of the blade disposed on the radially-inner side of the tip included in the first radial-directional cross section in a blade-height range of 50% or more being inclined downstream in a rotational direction of the impeller with respect to a radial direction; and
the blade has a second radial-directional cross section which is a cross section orthogonal to the axial direction at an axial-directional position passing a tip of the second edge, at least a part of the second radial-directional cross section in a blade-height range of 50% or more being inclined upstream in the rotational direction of the impeller with respect to the radial direction,
wherein, for each of the two or more blades, when, on a second reference line connecting midpoints of the second radial-directional cross section in a blade thickness direction, a second hub-side reference point is defined as a radial-directional position of the blade at the hub and a second tip-side reference point is defined as a radial-directional position of the tip at the second edge, and
the second-tip side reference point is positioned upstream of the second hub-side reference point in the rotational direction,
wherein, for each of the two or more blades, a phase angular difference $\Delta\theta_2$ between the second tip-side reference point and the second hub-side reference point is not smaller than 20 angular degrees.

* * * * *